A. A. KENT.
Ore-Washer.
No. 203,547.  Patented May 14, 1878.
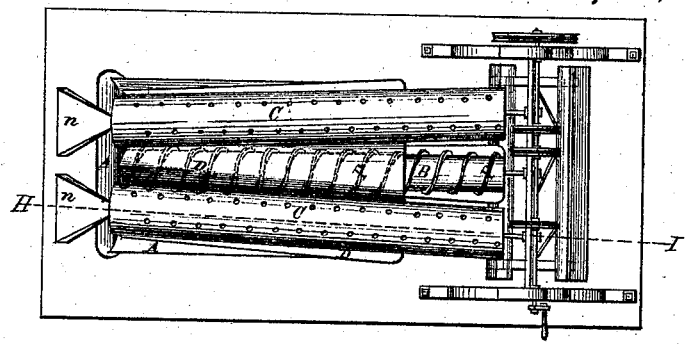
—Fig. 1.—
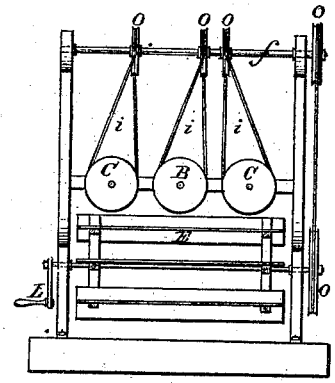
—Fig. 2.—
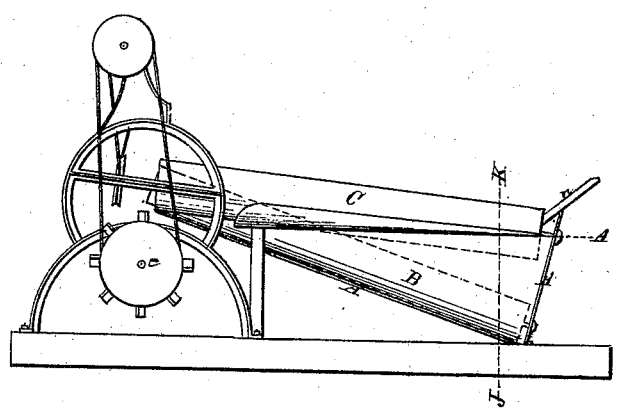
—Fig. 3.—
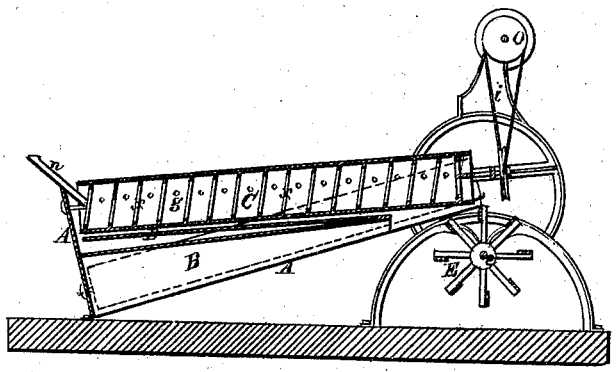
—Fig. 4.—
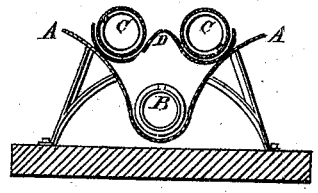
—Fig. 5.—
— WITNESSES: —
Robert S. Roeschlaub
Franklin King
— INVENTOR: —
Artemas A. Kent

UNITED STATES PATENT OFFICE.

ARTEMAS A. KENT, OF DENVER, COLORADO.

IMPROVEMENT IN ORE-WASHERS.

Specification forming part of Letters Patent No. 203,547, dated May 14, 1878; application filed September 13, 1876.

*To all whom it may concern:*

Be it known that I, ARTEMAS A. KENT, of the city of Denver, State of Colorado, have invented a new and useful Improvement in Separating Metals from Earth and Pulverized Ores, which improvement is set forth in the following specification, reference being had to the accompanying drawings, in which—

Figure 1 is a top view; Fig. 2, a front view; Fig. 3, a side view; Fig. 4, a longitudinal section on line H I, Fig. 1; Fig. 5, a transverse section on line J K, Fig. 3.

The object of my invention is to expedite the process of washing metals, to separate them from earth and ores, and at the same time to render it more thorough and effectual, more economical in the use of water, and to employ the surplus water and refuse as it passes from the machine as a motor.

To illustrate: A, Figs. 1, 3, 4, and 5, represents a reservoir, to be made of or lined with amalgamated plates, its base being constructed on an inclination longitudinally, and rounded transversely, to favor the working of a screw or spiral blade; and when the machine is in use it should be filled with water nearly to the upper line A, Fig. 3.

B represents a cylinder, externally provided with a spiral blade or screw, P, and suspended on a shaft, suitably for being rotated, sufficiently near the inclined base of the reservoir A to be effectual in elevating and discharging the débris that may collect there by the working of the machine.

C C are cylinders suspended on shafts suitably for being rotated, and to be partially submerged in the water contained in the reservoir A when in use. These cylinders are internally provided with spiral blades or screws $x$, and may be covered with perforated plates $g$, Fig. 4, or with slats running lengthwise, with space between, to allow the finer parts of the materials being worked to pass through.

D is an amalgamated plate, suitably constructed and arranged to catch the sediment that escapes through the openings in the peripheries of cylinders C C, convey it back, and drop it into the reservoir A.

E, with its connections of pulleys and belts $i$, counter-shafts $f$ and $e$ to the ends of the cylinders C B C, Fig. 2, represents the device when the surplus water and débris, as they pass from the machine, are used as a motor.

To operate the machine, the reservoir A should be supplied with water, and as it is absorbed or diminished in process of working, it should be replaced and kept at such a depth as is found to be most suitable to the different grades of ore. I also introduce atmospheric air into the water by any suitable means, to produce more motion or agitation when working minerals that require more than is produced by the action of the revolving cylinders; and when the machine is running, the materials to be operated upon will be passed into the cylinders C C at $n$ $n$, and as they are partially submerged in water the materials will become thoroughly incorporated therewith; and by the action of the spiral blades $x$ $x$ the coarse particles will be propelled onward and ejected at the opposite end, while the fine particles will drop through the apertures in the sides of the cylinders, and, falling onto the plate D, will be carried back and dropped into the base of the reservoir A, where they will again be subjected to a thorough agitation; and by the action of the screw P the lighter particles will be carried up the inclined plane and thrown out at the apex, while the heavier particles will either adhere to the amalgamated plates or remain in the lower part of the reservoir. Meanwhile, as the surplus water and débris pass from the machine, they fall upon the wheel E, causing it to revolve. This, in turn, communicates its force to the cylinders C, B, and C, to assist in operating them.

I claim as my invention—

The combination of the rotary cylinder or cylinders C, having openings in their peripheries, and provided with internal screw-conveyers, the receiving-chute D, and the screw-conveyer B, substantially as and for the purpose described.

Witnesses:  ARTEMAS A. KENT.
BEN LANE POSEY,
DWIGHT L. THOMPSON.